(12) United States Patent
Song et al.

(10) Patent No.: US 11,217,981 B2
(45) Date of Patent: Jan. 4, 2022

(54) BUSWAY AND CORRESPONDING ELECTRICAL COMPONENT

(71) Applicant: Schneider Electric Industries SAS, Rueil Malmaison (FR)

(72) Inventors: Xianfeng Song, GuangZhou (CN); Jianliang Huang, GuangZhou (CN); Shiqi Cheng, GuangZhou (CN); Suman Shrestha, GuangZhou (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/935,574

(22) Filed: Jul. 22, 2020

(65) Prior Publication Data

US 2021/0028610 A1    Jan. 28, 2021

(30) Foreign Application Priority Data

Jul. 22, 2019    (CN) .......................... 201921152452.6

(51) Int. Cl.
*H05K 5/00* (2006.01)
*H02G 5/08* (2006.01)
*H01R 25/14* (2006.01)

(52) U.S. Cl.
CPC ............. *H02G 5/08* (2013.01); *H01R 25/142* (2013.01); *H01R 25/145* (2013.01)

(58) Field of Classification Search
CPC .......... H02G 5/08; H01H 71/02; H01H 71/10; H01R 25/142
USPC ................................................. 174/520, 72 R
See application file for complete search history.

(56) References Cited

U.S. PATENT DOCUMENTS

2018/0062368 A1\* 3/2018 Lewis .................. H01R 25/142

\* cited by examiner

*Primary Examiner* — Phuong Chi Thi Nguyen
(74) *Attorney, Agent, or Firm* — Locke Lord LLP (57) ABSTRACT

Embodiments of the present disclosure relate to a busway and a corresponding electrical component. The busway includes a profile and a conductor. The profile is disposed on a first side, a second side and a third side, wherein the first side and the second side are parallel to each other, the third side is parallel to an extending direction of the busway and adjacent to the first side and the second side, and at least a part of the profile on the first side and the second side is planar. The conductor is disposed within a space defined by the first side, the second side and the third side, and the conductor is U-shaped and opens towards a fourth side that is parallel to the third side and adjacent to the first side and the second side. According to embodiments of the present disclosure, a fast, reliable electrical connection can be achieved.

10 Claims, 8 Drawing Sheets

BUSWAY AND CORRESPONDING ELECTRICAL COMPONENT

FIELD

Embodiments of the present disclosure generally relate to the electrical field, and more specifically, to a busway and a corresponding electrical component.

BACKGROUND

In the electrical field, a busway is a closed electrical device formed of metal for distributing relatively high power to various components of an electrical system. The busway can receive a large amount of current capacity and exhibit good electrical and mechanical performances. Moreover, the busway has good flame resistance and thus its safety and reliability are high. Therefore, the busway has increased in popularity.

Some methods have been proposed for accomplishing connections between the busway with other electrical components. However, mounting a jack box by rotating it around a lateral edge of the busway or a certain central axis is complicated.

SUMMARY

Embodiments of the present disclosure provide a busway and a corresponding electrical component to at least improve connections between the busway and other electrical components.

In a first aspect, there is provided a busway. The busway comprises: a profile disposed on a first side, a second side and a third side of the busway, the first side and the second side being parallel to each other, the third side being parallel to an extending direction of the busway and adjacent to the first side and the second side, at least a part of the profile on the first side and the second side being planar; and a conductor disposed within a space defined by the first side, the second side and the third side, the conductor being U-shaped and opening towards a fourth side, and the fourth side being parallel to the third side and adjacent to the first side and the second side.

According to embodiments of the present disclosure, the busway may be guided and pushed into a respective electrical component, thereby achieving a firm electrical connection in an easier way.

In some embodiments, the profile comprises a plurality of partitions extending parallel to the first side and the second side from the third side and partitioning the space into a plurality of receptacles, each of the plurality of receptacles opening towards the fourth side; and the conductor comprises a plurality of conductors that are disposed within the plurality of receptacles, respectively. In this way, the structural strength of the profile can be improved, and the space within the profile can be utilized more reasonably and efficiently.

In some embodiments, the busway comprises: an insulator partly disposed between each of the receptacles and each of the plurality of conductors and opening towards the fourth side. As such, the safety of the busway can be improved.

In some embodiments, the insulator comprises: a base disposed between each receptacle and each conductor and comprising a first face, a second face and a third face, wherein the first face and the second face are parallel to each other and perpendicular to the third face; and an extension portion comprising a first extension member and a second extension member disposed oppositely with an aperture formed therebetween, and wherein the aperture is flared in a direction away from the base. In this circumstance, a fast connection between the busway and the electrical component can be accomplished.

In some embodiments, the busway further comprises: an opening disposed on the profile at the first side and/or the second side. Therefore, the stability of the connection can be ensured effectively in a simple manner.

In some embodiments, the conductor comprises: pressing portions disposed at both ends of the conductor along the extending direction and recessed perpendicular to the extending direction from a surface of the conductor towards a center of the conductor. In this way, the conductor can withstand a pressure similar to a solid conductor, thereby ensuring the effect of the electrical connection.

In some embodiments, the profile comprises: a first groove and a second groove disposed adjacent to the first side and the second side, respectively, wherein, along a direction perpendicular to the extending direction, a sidewall of the first groove is at a first distance away from the first side, a sidewall of the second groove is at a second distance away from the second side, and the first distance is unequal to the second distance. Accordingly, it can be guaranteed that the busway is coupled to the electrical component in a correct orientation.

In a second aspect, embodiments of the present disclosure relate to an electrical component. The electrical component comprises: the busway according to the first aspect; and a jack box, comprising: a plug-in member disposed on a first surface of the jack box and facing away from the first surface along a plug-in direction perpendicular to the first surface, wherein the plug-in member is adapted to pass through an opening of the conductor to be coupled with the conductor. In this way, the busway can be secured conveniently into the plug-in box in a straight manner.

In some embodiments, the jack box further comprises: a first protrusion and a second protrusion parallel to each other and disposed on the first surface of the jack box, the first protrusion and the second protrusion facing away from the first surface in the plug-in direction and respectively comprising: a first snap-fit member and a second snap-fit member extending parallel to the first surface from the first protrusion and the second protrusion, respectively, and adapted to insert into an opening on the profile. As such, the jack box can be inserted at any position of the busway.

In some embodiments, the jack box further comprises: a first rod and a second rod disposed adjacent to the first surface, the first rod and the second rod coupled to the first protrusion and the second protrusion, respectively; and a rotatable connector disposed adjacent to the first surface and coupled to the first rod and the second rod, wherein a rotation of the rotatable connector drives the first rod and the second rod to move away from each other in a direction parallel to the first surface, such that the first protrusion and the second protrusion move away from each other in the direction parallel to the first surface. In this way, the jack box can be prevented from detaching from the busway.

In some embodiments, the plug-in member comprises: a matrix extending along the plug-in direction; and a first arm and a second arm extending from the matrix along the plug-in direction, the first arm and the second arm being bent towards opposite directions perpendicular to the plug-in direction, respectively. In this way, a connection can be achieved in a cost effective manner, which reduces the cost of the electrical component.

According to embodiments of the present disclosure, a fast, reliable electrical connection can be achieved in a straight plugging-in manner.

BRIEF DESCRIPTION OF THE DRAWINGS

Through the following detailed description of embodiments of the present disclosure with reference to the accompanying drawings, the above and other objectives, features, and advantages of the present disclosure will become more apparent. Embodiments of the present disclosure will be illustrated exemplarily, without limitation, throughout the drawings in which.

DETAILED DESCRIPTION OF EMBODIMENTS

Principles of the present disclosure will now be described with reference to various example embodiments as illustrated in the drawings. It is to be understood that description of those embodiments is merely provided for enabling those skilled in the art to better understand and further implement the present disclosure, without suggesting limitation to the scope of the present disclosure in any manner. It is also to be understood that the same or similar reference symbols, if feasible, are employed throughout the drawings, which can refer to the same or similar functionalities. From the description below, those skilled in the art would readily realize that the substitute embodiments of the structure and method illustrated herein can be employed, without departing from the principles of the present disclosure described herein.

As used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The term "another embodiment" is to be read as "at least another embodiment." The terms "first," "second," and the like may refer to different or the same objects. Other definitions, either explicit or implicit, may be included below. Definitions of respective terms should be consistent throughout the specification unless the context clearly indicates otherwise.

As aforementioned, some existing designs are relatively complicated and impose a strict requirement on the conductor, which restricts the promotion of the busway. Accordingly, there is a need for a simple, convenient manner to achieve a connection of a busway with other electrical components in an electrical component.

Figure 1:
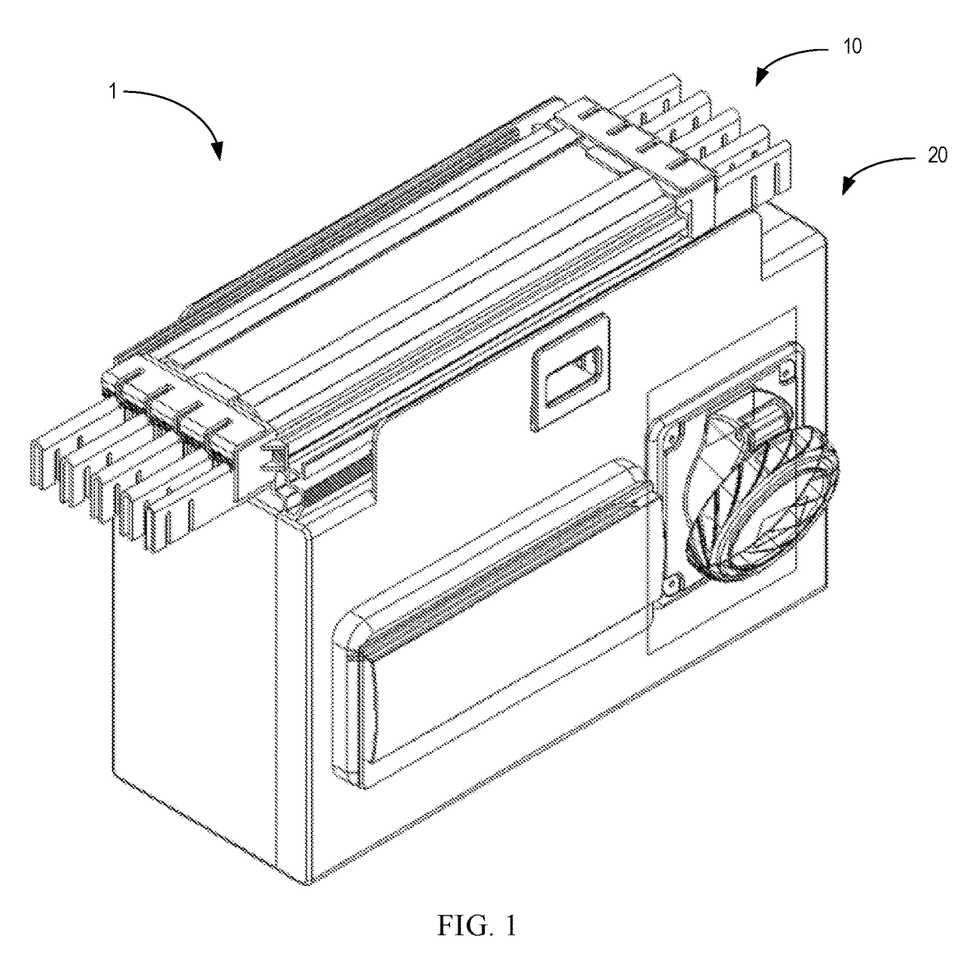
FIG. 1 illustrates a perspective view of an electrical component according to an example embodiment of the present disclosure.
Figure 2:
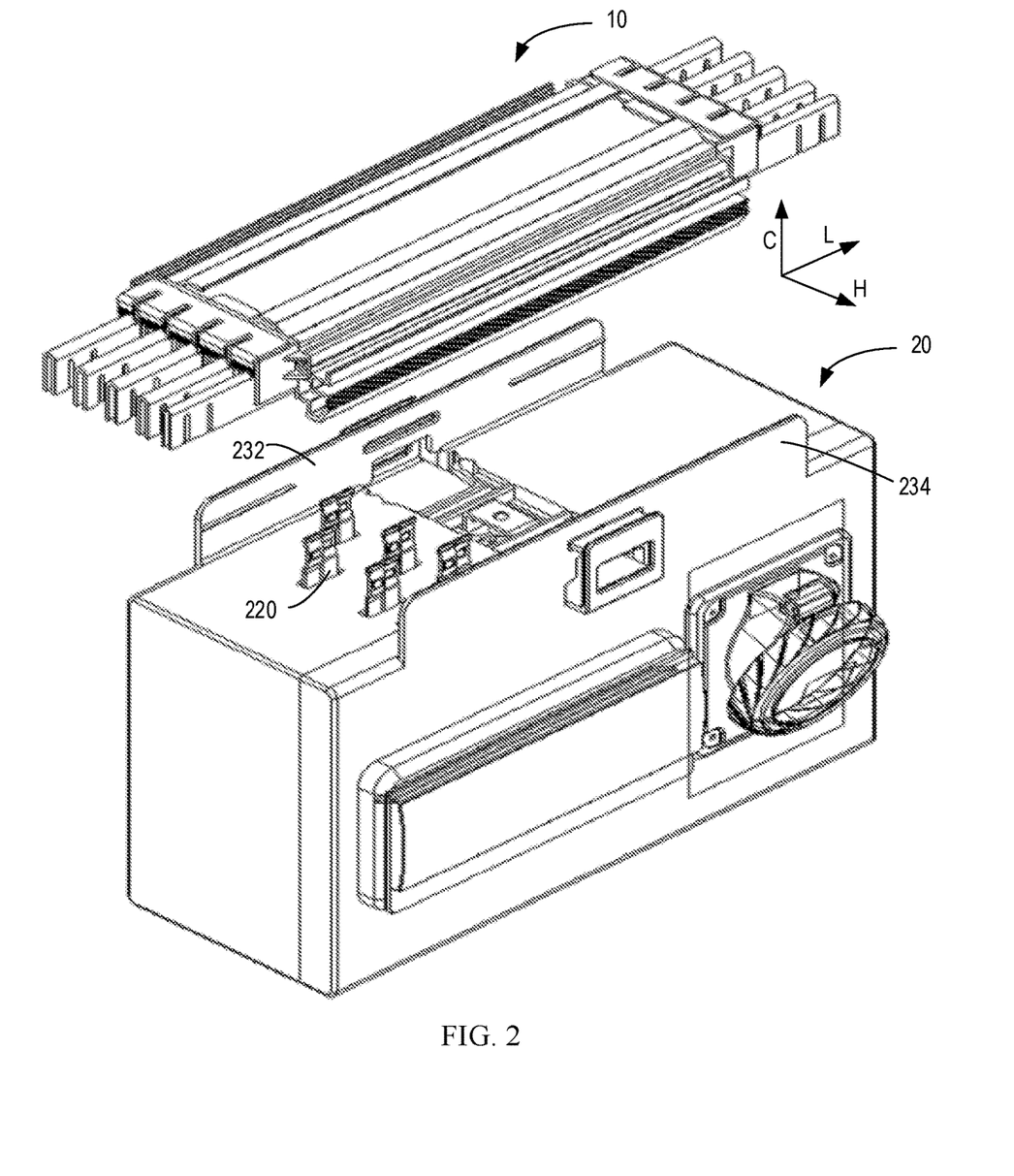
FIG. 2 illustrates an exploded view of the electrical component in FIG. 1.

FIGS. 1 and 2 illustrate some example implementations of an electrical component 1 according to embodiments of the present disclosure. As shown, the electrical component 1 generally includes a busway 10 and a jack box 20 electrically connected to the busway 10.

Figure 3:
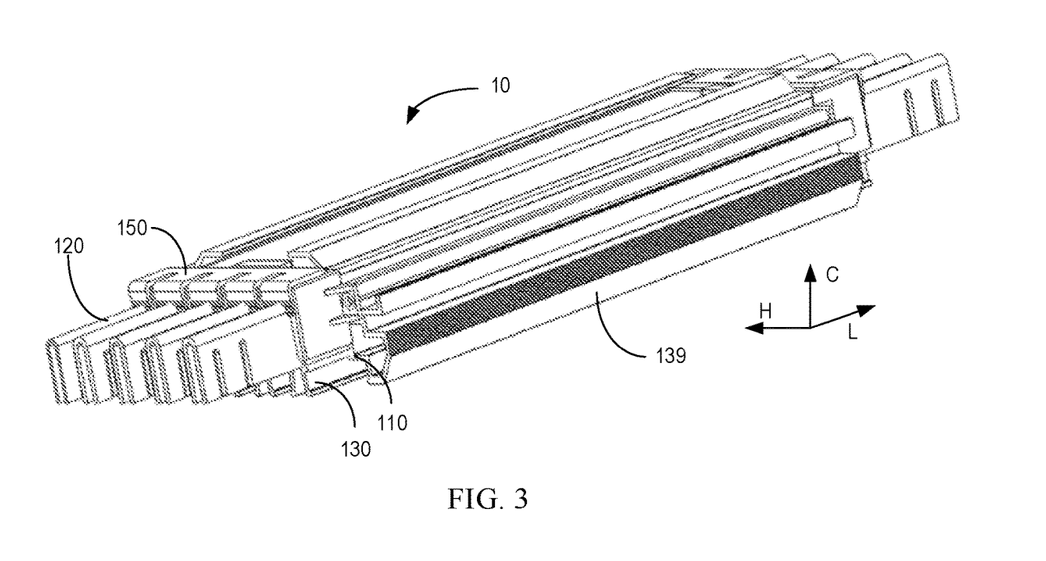
FIG. 3 illustrates a perspective view of a busway according to an example embodiment of the present disclosure.

Reference will now be made to FIGS. 3 to 7 to describe some example implementations of the busway 10 according to embodiments of the present disclosure. As shown in FIG. 3, the busway 10 generally includes a profile 110 and a conductor 120. The busway 10 is elongated and extends in its extending direction L.

Figure 4:
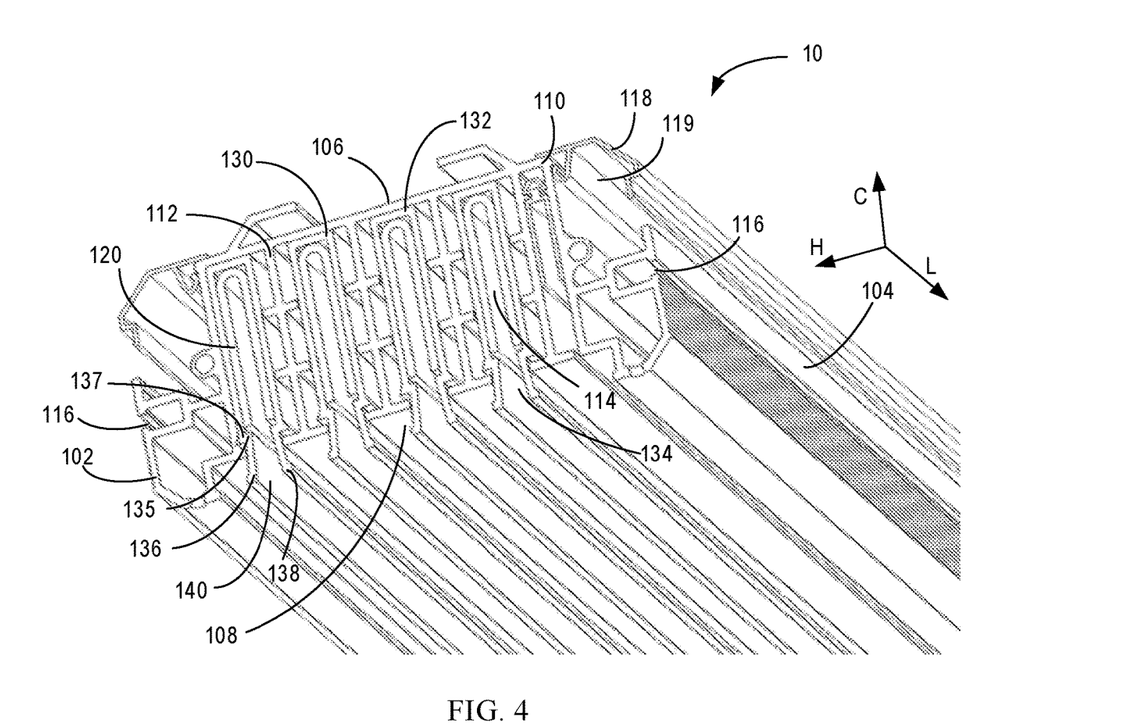
FIG. 4 illustrates a schematic diagram of a cross section of the busway in FIG. 3.

FIG. 4 illustrates a schematic diagram of a cross section of the busway 10 perpendicular to the extending direction L. As shown, the busway 10 includes a first side 102, a second side 104, a third side 106 and a fourth side 108, with the first side 102 and the second side 104 parallel to each other, the third side 106 and the fourth side 108 parallel to each other, and the third side 106 and the fourth side 108 adjacent to the first side 102 and the second side 104.

The profile 110 of the busway 10 is disposed on the first side 102, the second side 104 and the third side 106. The busway 10 acts as an outer housing of the busway 10. As shown in FIG. 4, a conductor 120 of the busway 10 is disposed within a space defined by the first side 102, the second side 104 and the third side 106. The conductor 120 is U-shaped and opens towards the fourth side 108. As shown in FIG. 4, the profile 110, also substantially U-shaped, is used for protecting the conductor 120 disposed therein. On the first side 102 and the second side 104, at least parts of the profile 110 are configured as planes. These planes may be used for guiding. When the busway 10 is coupled to other electrical components, these planes allow the busway 10 to closely connect with other electrical components along a plug-in direction C parallel to the planes.

According to embodiments of the present disclosure, the busway 10 can be plugged into an electrical component in a straight direction to achieve a reliable connection. In addition, the straight plugging-in can simplify the structure of the busway 10 and thus reduce the manufacturing cost of the busway 10.

In some embodiments, the profile 110 may include a plurality of partitions 112. As shown in FIG. 4, these partitions 112 extend from the third side 106 in a direction parallel to the first side 102 and the second side 104, and partition the space defined by the first side 102, the second side 104 and the third side 106 into a plurality of receptacles 114.

As shown in FIG. 4, each of the plurality of receptacles 114 opens towards the fourth side 108. The conductor 120 may include a plurality of conductors which are disposed within the plurality of receptacles 114, respectively. In this way, the partitions 112 may play a similar role as reinforcement ribs, for reinforcing the strength of the profile 110. Moreover, with the plurality of receptacles 114 formed by the partitions 112, the space within the profile 110 can be utilized efficiently.

As shown in FIG. 3, in some embodiments, the busway 10 may include an insulator 130. The insulator 130 can be disposed partly between each receptacle 114 and each of a plurality of conductors, to separate the receptacle 114 from the respective conductor 120. As shown in FIG. 3, the insulator 130 is U-shaped and opens towards the fourth side 108.

By sleeving the insulator 130 onto the conductor 120 to form an assembly, the assembly formed is fit into the profile 110 to form the basic structure of the busway 10. In the structure, open sides of the conductors 120 face towards one side, thus leaving openings for docking the busway 10 with other electrical components.

Figure 6:
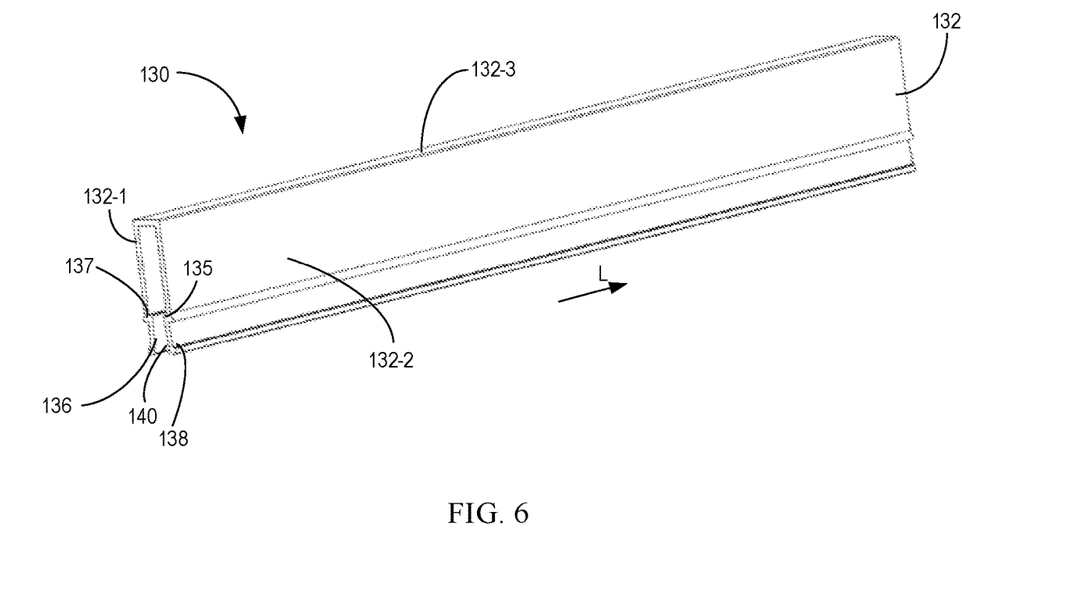
FIG. 6 illustrates a schematic diagram of an insulator in the busway in FIG. 3.

In some embodiments, as shown in FIG. 6, the insulator 130 may include a base 132 and an extension portion 134 coupled to the base 132. The base 132 is disposed between each receptacle 114 and each conductor 120. The base 132 includes a first face 132-1, a second face 132-2 and a third face 132-3. As shown, the first face 132-1 and the second face 132-2 are parallel to each other, and are both perpendicular to the third face 132-3. The first face 132-1, the second face 132-2 and the third face 132-3 form a U-shaped structure, thereby ensuring that the base 132 is formed with an opening, and the opening direction is consistent with the opening direction of the conductor 120.

The extension portion 134 includes a first extension member 136 and a second extension member 138. The first extension member 136 is disposed opposite the second extension member 138, and an aperture 140 is formed between the first extension member 136 and the second extension member 138. As shown in FIG. 3, the aperture 140 is flared in a direction away from the base 132. In other words, the aperture 140 is tapered in a direction towards the base 132.

In this way, the first extension member 136 and the second extension member 138 form a guiding feature of the insulator 130 to facilitate the guiding of an electrical component into the insulator 130, so as to achieve a more effective connection with the conductor 120.

In some embodiments, the insulator 130 may be formed of a resilient material. As such, when an electrical component cooperating with the busway 10 is coupled with the conductor 120 through the aperture 140, the electrical component may first expand the aperture 140 slightly under an effect of the elasticity of the insulator 130, and after the electrical component has passed through the aperture 140 to make contact with the conductor 120, the aperture 140 is retracted to the initial state due to elasticity. As shown in FIG. 3, such a design on the shape of the aperture 140 ensures that the electrical component would not easily be detached from the conductor 120, to achieve more firm engagement between the electrical component and the conductor 120.

In some embodiments, the width of the aperture 140 formed by the insulator 130 along a transverse direction H is adapted to cooperate with two outer surfaces of the conductor 120. In some embodiments, as shown in FIG. 6, a shoulder 135 facing inwards at a lower part of the insulator 130 may secure the conductor 120, and a shoulder 137 facing outwards at the lower part of the insulator 130 may cooperate with the profile 110 and be secured. In this way, the inner structure of the busway 10 can be more stable and reliable.

As shown in FIG. 4, in some embodiments, the busway 10 may further include an opening 116 which is disposed on the profile 110 at the first side 102 or the second side 104. In some embodiments, the opening 116 may be disposed on the profile 110 at both of the first side 102 and the second side 104. In an alternative embodiment, the opening 116 is disposed on the planar portion of the profile 104 at the first side 102 or the second side 104.

In some embodiments, as shown in FIG. 3, the profile 110 may also be provided thereon with a chamfer 139 such that the busway 10 can be connected to other electrical components more smoothly.

Figure 5:
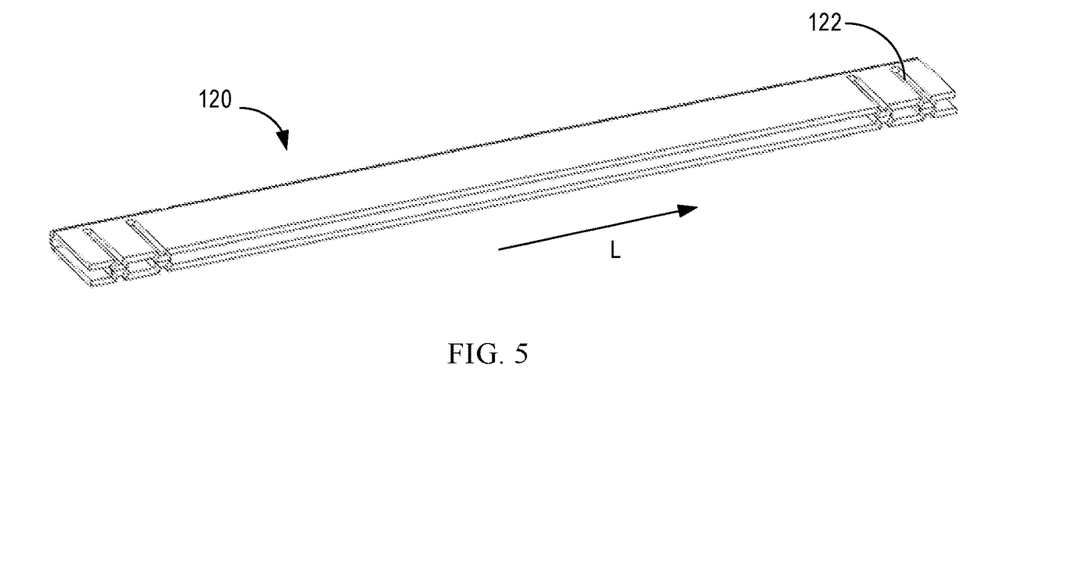
FIG. 5 illustrates a schematic diagram of a conductor in the busway in FIG. 3.

FIG. 5 illustrates a perspective view of the conductor 120 as shown in FIG. 3 in detail. As shown, in some embodiments, the conductor 120 may include two pressing portions 122 disposed at both ends of the conductors 120 along the extending direction L. The pressing portions 122 are recessed from the surface of the conductor 120 towards the center of the conductor 120 along a direction perpendicular to the extending direction L.

In this way, at the ends of the conductor 120, the two sides of the conductor 120 are compressed towards the center until they are firmly pressed to be in contact with each other. The design of the press portions 122 allows the conductor 120 to withstand a pressing force corresponding to that of a solid conductor. As such, the conductor 120 can achieve an efficient electrical connection.

In some embodiments, the pressing portion 122 can be formed by squeezing and deforming the opening portions at both ends. It is to be understood that this is merely an example. In other embodiments, the pressing portion 122 may be formed in other alternative ways as long as the conductor 120 can withstand, via the pressing portions 122, a pressing force corresponding to that of a solid conductor. For example, in some embodiments, the conductor 120 may be formed by filling the conductor 120 with material.

In some embodiments, the pressing portion 122 may be disposed at only one end of the conductor 120. In some embodiments, the number of the pressing portions 122 at the ends of the conductor 120 may be the same. In other embodiments, the number of the pressing portions 122 at the ends may be different. In some embodiments, as shown in FIG. 4, each end of the conductor 120 may be provided with two pressing portions. Of course, this is merely an example. The conductor 120 at both ends may be provided with other numbers of the pressing portions 122, which can be adjusted according to the specific utilization environment. These embodiments also fall in the scope of the present disclosure.

Figure 7:
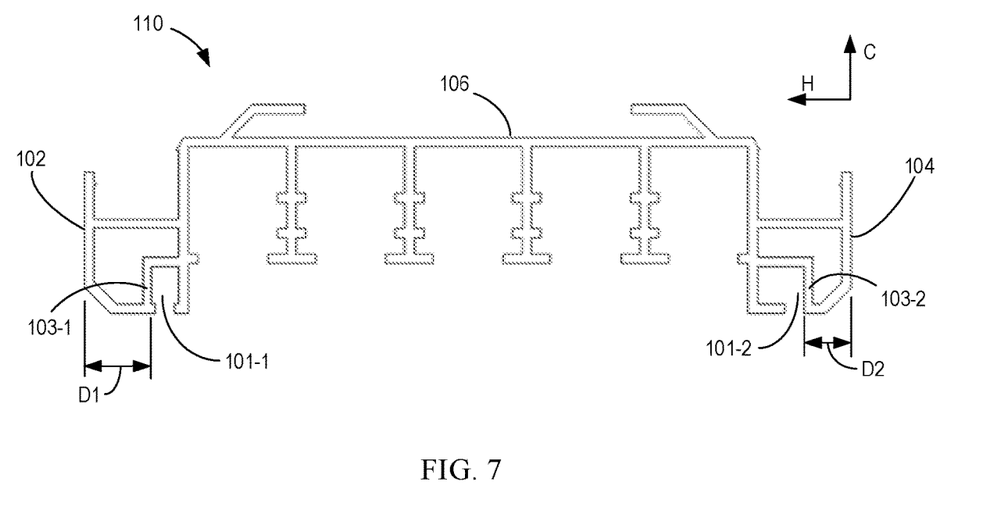
FIG. 7 illustrates a schematic diagram of a profile in the busway in FIG. 3.

In some embodiments, as shown in FIG. 7, the profile 110 may include a first groove 101-1 and a second groove 101-2, wherein the first groove 101 is adjacent to the first side 102 of the busway 10, and the second groove 101-2 is adjacent to the second side 104 of the busway 10. As shown, the first groove 101-1 and the second groove 101-2 may extend along the extending direction of the busway 10, and may be elongated. The first groove 101-1 includes a sidewall 103-1 parallel to the first side 102 and the second side 104. Likewise, the second groove 101-2 includes a sidewall 103-2 parallel to the first side 102 and the second side 104 as well.

As shown in FIG. 7, seen from a direction H perpendicular to the extending direction L, the sidewall 103-1 of the first groove 101-1 is at a first distance D1 away from the first side while the sidewall 103-2 of the second groove 101-2 is at a second distance D2 away from the second side 104. The first distance D1 is not equal to the second distance D2.

In this way, the first groove 101-1 and the second groove 101-2, disposed in an asymmetrical manner, ensures that the busway 10 is connected to an electrical component in a predetermined manner. This is because, when a user attempts to couple the busway 10 to other electrical components in a wrong orientation (for example, an orientation at an angle 180° relative to the orientation as shown in FIG. 7), the asymmetrical design of the first groove 101-1 and the second groove 101-2 will prevent this coupling. As such, the accuracy of the electrical connection can be guaranteed, thereby improving the safety of the electrical device.

In some embodiments, as shown in FIG. 7, the first distance D1 may be greater than the second distance D2. Of course, this is provided merely as an example, and the first distance D1 may also be less than the second distance D2.

In some embodiments, the profile 110 may be formed of aluminum. It is to be understood that the profile 110 may be formed of other materials known and/or to be developed in the future, in addition to aluminum. For example, in some embodiments, it may be formed of an alloy containing aluminum. The specific material is not limited herein as long as it can provide a proper rigidity to protect the components within the profile 110. In some embodiments, the profile 110 may be formed by a conventional sheet metal processing technology, for example, by extrusion.

As shown in FIG. 3, in some embodiments, there may be provided one or more stops 150 to achieve the mutual restriction of the profile 110, the conductor 120 and the insulator 130 in the extending direction L.

Figure 8:
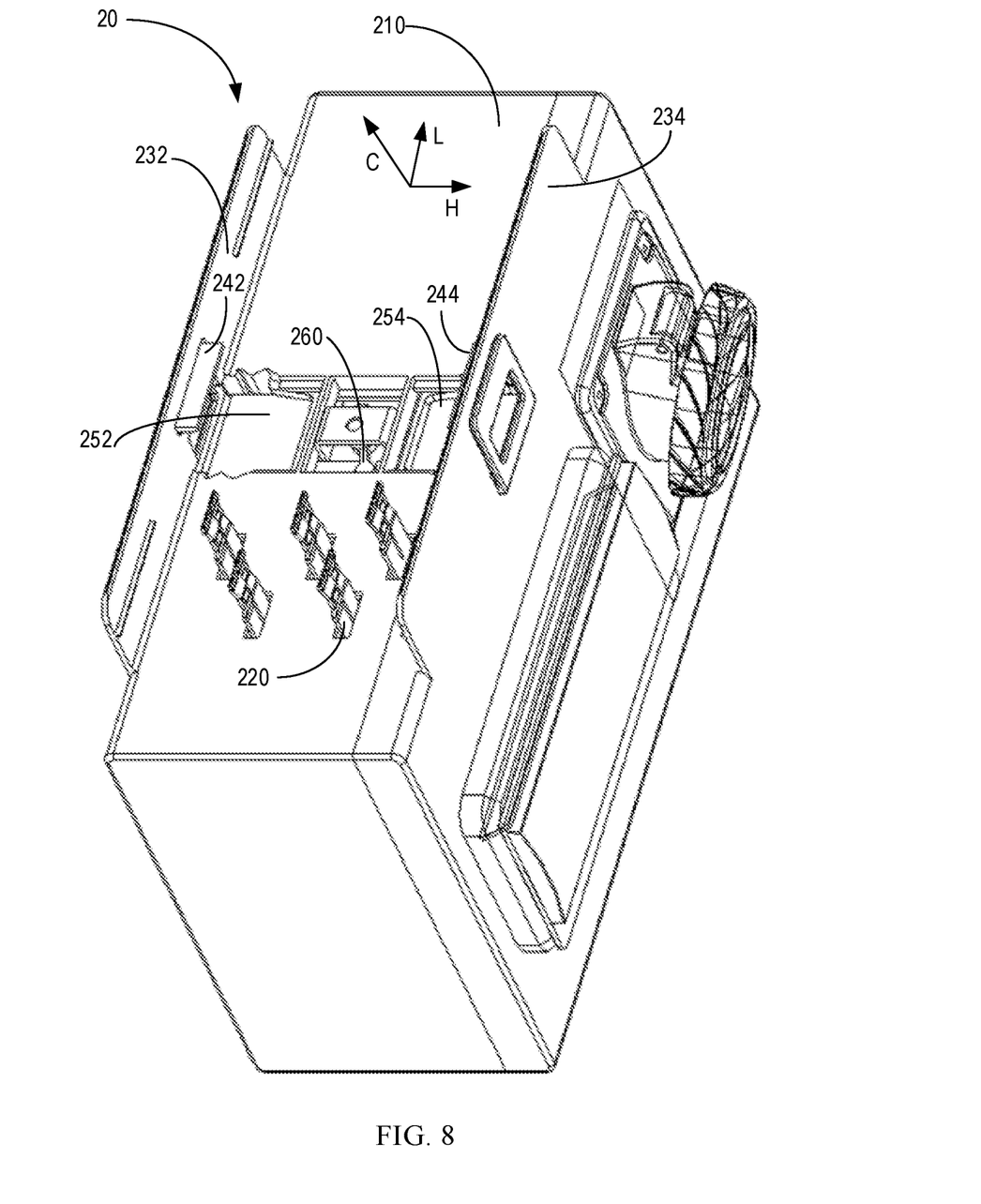
FIG. 8 illustrates a perspective view of a jack box according to an example embodiment of the present disclosure.
Figure 9:
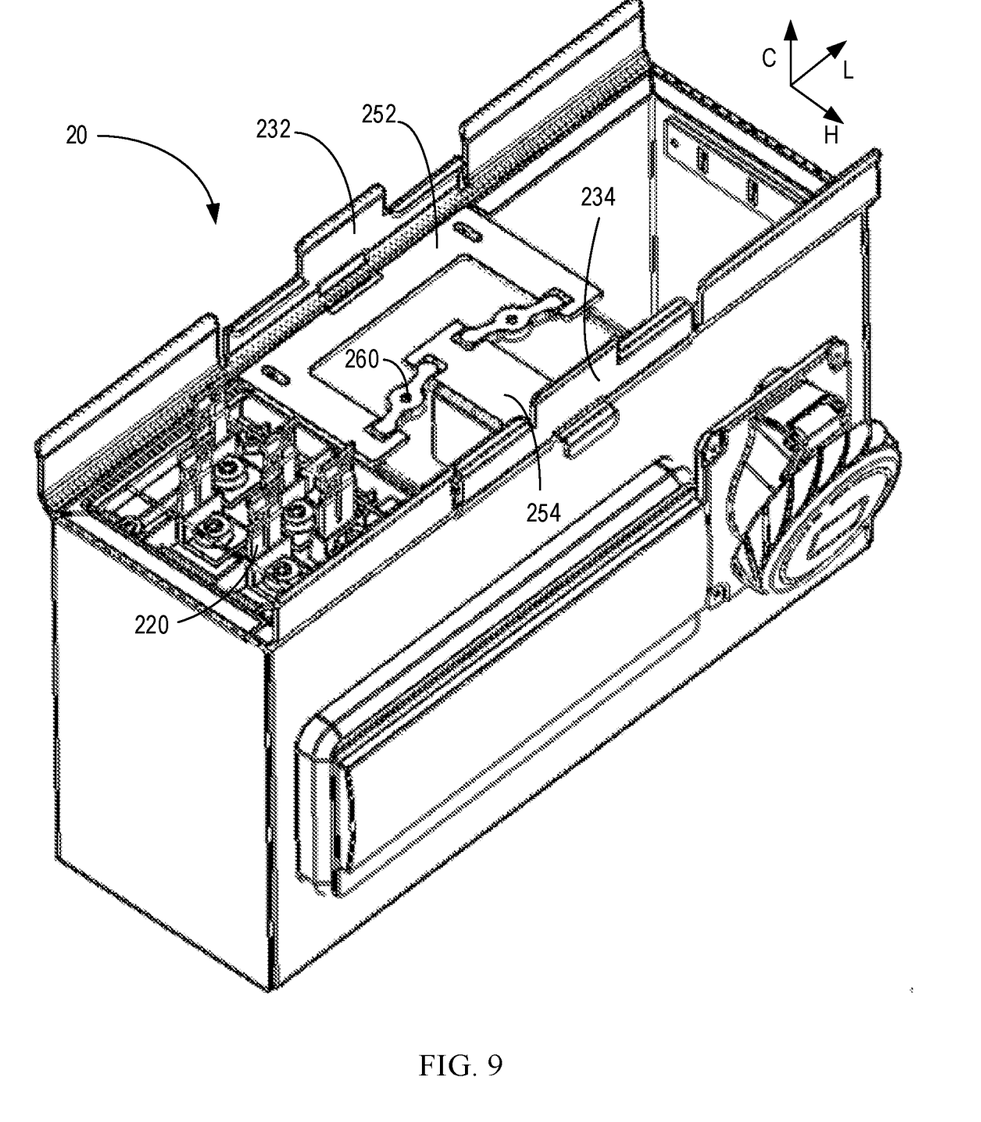
FIG. 9 illustrates a perspective view of a jack box according to a further embodiment of the present disclosure.

Referring back to FIG. 2, embodiments of the present disclosure provide an electrical component 1. As shown, the electrical component 1 generally includes a busway 10 as described above and a jack box 20. Reference will be made to FIGS. 8 and 9 hereinafter to describe some example embodiments of the jack box 20 according to embodiments of the present disclosure.

As shown, the jack box 220 includes a plug-in member 220. The plug-in member 220 is disposed on a first surface 210 of the jack box 20 and faces away from the first surface 210 along a plug-in direction C perpendicular to the first surface 210. The plug-in member 220 is adapted to pass through the opening of the conductor 120 of the busway 10 to couple to the conductor 120.

As aforementioned, since the busway 10 is provided thereon with a guiding feature, the plug-in member 220 may be guided into the opening of the conductor 120 through a linear motion. In addition, due to elastic deformation of the plug-in member 220 generated during the docking procedure, an effective electrical connection between the conductor 120 and the plug-in member 220 is formed. Moreover, since the busway 10 is elongated and extends along the extending direction L, the jack box 20 may be mounted at any position on the busway 10, except the position of the connector.

In some embodiments, the number of the plug-in members 220 may be equal to the number of the conductors 120 of the busway 10. In some other embodiments, the number of the plug-in members 220 may be unequal to the number of the conductors 120 of the busway 10. In some embodiments, the plug-in member 220 is adapted to be inserted into the conductor 120 of the busway 10 in terms of position and shape, to ensure effective abutting between the jack box 20 and the busway 10.

Referring back to FIG. 4, in some embodiments, the busway 10 may also include engagement members 118. The engagement members 118 extend along with the profile 110 and are disposed at left and right sides above the profile 110, thereby forming a routing channel 119 together with the profile 10. The routing channel 119 can receive and protect communication lines from the jack box 20, so as to provide a communication channel to the jack box 20.

In some embodiments, as shown in FIG. 8 or 9, the jack box 20 may further include a first protrusion 232 and a second protrusion 234 disposed on the first surface 210. The first protrusion 232 and the second protrusion 234 are parallel to each other and face away from the first surface 210 along the plug-in direction C. The first protrusion 232 includes a first snap-fit member 242, and the first snap-fit member 242 extends from the first protrusion 232 in parallel with the first surface 210. Likewise, the second protrusion 234 includes a second snap-fit member 244, and the second snap-fit member 244 extends from the second protrusion 234 in parallel with the first surface.

Referring to FIG. 4, the first snap-fit member 242 is adapted to insert into the opening 116 on the first side 102 of the profile 110 of the busway 10. Correspondingly, the second snap-fit member 244 is adapted to insert into the opening 116 on the second side 104 of the profile 110 of the busway 10. In this way, the busway 10 can be coupled firmly to the jack box 20 to avoid potential risks caused by a loose contact therebetween.

In some embodiments, the plug-in member 220 may be formed of copper. It is to be understood that the specific material is not limited to embodiments of the present disclosure as long as it can provide a proper characteristic to achieve an effective electrical connection of the plug-in member 220. In additional to copper, the plug-in member 220 may be formed of other materials known and/or to be developed in the future. For example, in an alternative embodiment, it may be formed of copper plated with silver.

In some embodiments, as shown in FIGS. 8 and 9, the jack box 20 may include a first rod 252 and a second rod 254 adjacent to the first surface 210, wherein the first rod 252 is coupled to the first protrusion 232, and the second rod 254 is coupled to the second protrusion 234. The jack box may further include a rotatable connector 260 disposed adjacent to the first surface. The rotatable connector 260 is coupled to the first rod 252 and the second rod 254, and the rotation of the rotatable connector 260 drives the first rod 252 and the second rod 254 to move, causing the first rod 252 and the second rod 254 to move away from each other in a direction parallel to the first surface 210, and further causing the first protrusion 232 and the second protrusion 234 to move away from each other in a direction parallel to the first surface 210.

When the jack box 20 is docked with the busway 10, the rotatable connector 260 is rotated first to move the first protrusion 232 and the second protrusion 234 of the jack box 20 away from each other. In that case, the gap between the first protrusion 232 and the second protrusion 234 is increased to allow the busway 10 to be received in the jack box with less resistance. As the plug-in member 220 of the jack box 20 is inserted into the respective aperture 140 of the busway 10, the straight plugging-in of the busway 10 into the jack box 20 is accomplished.

In some embodiments, after moving to the predetermined position on the busway 10, the jack box 20 may release the rotatable connector 260 in an opposite direction to move the first protrusion 232 and the second protrusion 234 close to each other. Since the gap between the first protrusion 232 and the second protrusion 234 is reduced accordingly, they "hug" the jack box 20 tightly. In this way, the jack box 20 is secured firmly with the busway 10 via locking.

In some embodiments, the rotatable connector 260 may be in the form of a torsion spring. The torsion spring can store energy for energy conversion between the elastic potential energy and kinetic energy of the first protrusion 232 and the second protrusion 234.

Figure 10:
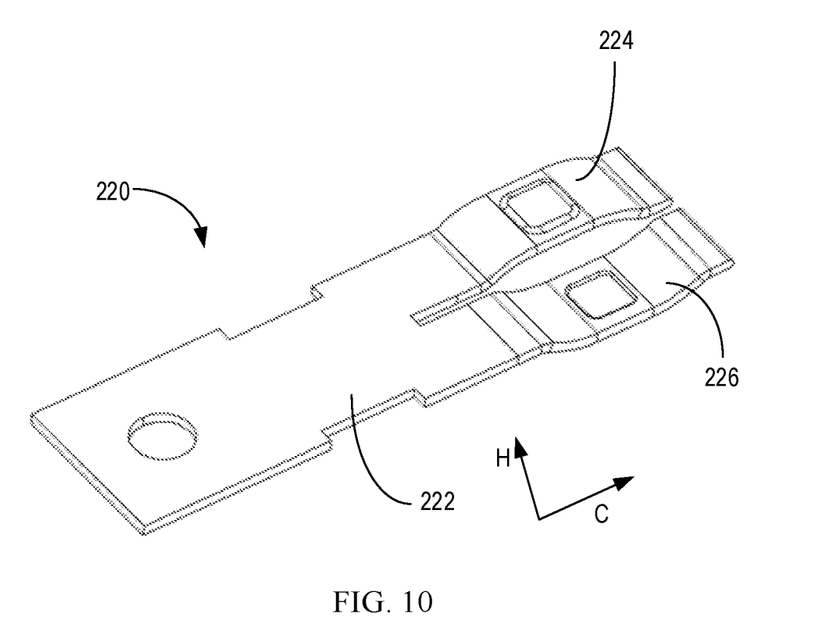
FIG. 10 illustrates a perspective view of a connector according to an example embodiment of the present disclosure.

In some embodiments, as shown in FIG. 10, the plug-in member 220 may include a matrix 222 extending along the plug-in direction C. The plug-in member 220 may further include a first arm 224 and a second arm 226. The first arm 224 and the second arm 226 are bent towards opposite directions perpendicular to the plug-in direction C, respectively. In this way, the first arm 224 and the second arm 226 of the plug-in member 220 may be formed thereon with local protrusions in the opposite directions. Therefore, the size of the plug-in member 20 in the transverse direction H is increased.

In some embodiments, the maximum sizes of the first arm 224 and the second arm 226 in the traverse direction H may be appropriately greater than the size of the opening of the conductor 120 in the traverse direction H. Due to the elasticity of the plug-in member 220, the first arm 224 and the second arm 226 of the plug-in member 220 may have tighter contact with the opening of the conductor 120. In this way, the effect of the electrical connection between the conductor 120 and the plug-in member 220 can be improved.

In some embodiments, as shown in FIG. 4, the respective conductors 120 may be parallel to one another along the extending direction L. As compared with the existing design in which a limited number of sockets are provided, the design according to the embodiment of the present disclosure can achieve the docking of the jack box 20 with the busway 10 at any position. In that case, a user can operate an electrical component 1 more conveniently. Moreover, the connection between the busway 10 and the jack box 20 enables a straight plugging-in, thereby simplifying the structure of the electrical component 1 and providing a reliable and fast electrical connection.

Embodiments of the present disclosure relate to a novel solution for busway power distribution. The electrical component 1 according to the present disclosure may be applied to various scenarios, for example, a data center and the like.

Although the claims of the present disclosure are directed to specific combinations of features, it is to be understood that the scope of the present disclosure further covers any novel feature disclosed implicitly or explicitly herein or summarized therefrom, or any novel combination of features, regardless of whether it relates to the same solution claimed in the following claims.

The invention claimed is:

1. A busway comprising:
a profile disposed on a first side, a second side and a third side of the busway, the first side and the second side being parallel to each other, the third side being parallel to an extending direction of the busway and adjacent to the first side and the second side, at least a part of the profile on the first side and the second side being planar; and
a conductor disposed within a space defined by the first side, the second side and the third side, the conductor being U-shaped and opening towards a fourth side, and the fourth side being parallel to the third side and adjacent to the first side and the second side;
wherein the profile comprises a plurality of partitions partitioning the space into a plurality of receptacles, and the conductor comprises a plurality of conductors,
wherein the busway comprises an insulator, wherein the insulator comprises:
a base disposed between each receptacle and each conductor and comprising a first face, a second face and a third face, wherein the first face and the second face are parallel to each other and perpendicular to the third face; and
an extension portion comprising a first extension member and a second extension member disposed oppositely with an aperture formed therebetween, and wherein the aperture is flared in a direction away from the base.

2. The busway of claim 1, further comprising:
an opening disposed on the profile at the first side and/or the second side.

3. The busway of claim 1, wherein the conductor comprises:
pressing portions disposed at both ends of the conductor along the extending direction and recessed perpendicular to the extending direction from a surface of the conductor towards a center of the conductor.

4. The busway of claim 1, wherein the profile comprises:
a first groove and a second groove disposed adjacent to the first side and the second side, respectively,
wherein, along a direction perpendicular to the extending direction, a sidewall of the first groove is at a first distance away from the first side, a sidewall of the second groove is at a second distance away from the second side, and the first distance is unequal to the second distance.

5. The busway of claim 1, wherein:
the plurality of partitions extending parallel to the first side and the second side from the third side, each of the plurality of receptacles opening towards the fourth side; and
the plurality of conductors are disposed within the plurality of receptacles, respectively.

6. The busway of claim 5, wherein
the insulator is partly disposed between each of the receptacles and each of the plurality of conductors, the insulator opening towards the fourth side.

7. An electrical component, comprising:
a busway, comprising:
a profile disposed on a first side, a second side and a third side of the busway, the first side and the second side being parallel to each other, the third side being parallel to an extending direction of the busway and adjacent to the first side and the second side, at least a part of the profile on the first side and the second side being planar; and
a conductor disposed within a space defined by the first side, the second side and the third side, the conductor being U-shaped and opening towards a fourth side, and the fourth side being parallel to the third side and adjacent to the first side and the second side;
wherein the profile comprises a plurality of partitions partitioning the space into a plurality of receptacles, and the conductor comprises a plurality of conductors,
wherein the busway comprises an insulator, wherein the insulator comprises:
a base disposed between each receptacle and each conductor and comprising a first face, a second face and a third face, wherein the first face and the second face are parallel to each other and perpendicular to the third face; and
an extension portion comprising a first extension member and a second extension member disposed oppositely with an aperture formed therebetween, and wherein the aperture is flared in a direction away from the base; and
a jack box, comprising:
a plug-in member disposed on a first surface of the jack box and facing away from the first surface along a plug-in direction perpendicular to the first surface, wherein the plug-in member is adapted to pass through an opening of the conductor to be coupled with the conductor.

8. The electrical component of claim 7, wherein the plug-in member comprises:

a matrix extending along the plug-in direction; and a first arm and a second arm extending from the matrix along the plug-in direction, the first arm and the second arm being bent towards opposite directions perpendicular to the plug-in direction, respectively.

9. The electrical component of claim 7, wherein the jack box further comprises:

a first protrusion and a second protrusion parallel to each other and disposed on the first surface of the jack box, the first protrusion and the second protrusion facing away from the first surface in the plug-in direction and respectively comprising:

a first snap-fit member and a second snap-fit member extending parallel to the first surface from the first protrusion and the second protrusion, respectively, and adapted to insert into an opening on the profile.

10. The electrical component of claim 9, wherein the jack box further comprises:

a first rod and a second rod disposed adjacent to the first surface, the first rod and the second rod coupled to the first protrusion and the second protrusion, respectively; and a rotatable connector disposed adjacent to the first surface and coupled to the first rod and the second rod, wherein a rotation of the rotatable connector drives the first rod and the second rod to move away from each other in a direction parallel to the first surface, such that the first protrusion and the second protrusion move away from each other in the direction parallel to the first surface.

* * * * *